Sept. 26, 1967 W. W. YARRISON ETAL 3,343,221
EXTENSIBLE CONDUIT FOR AN INJECTION MOLDING MACHINE
Original Filed Aug. 7, 1964 2 Sheets-Sheet 1

Inventors
Walter W. Yarrison
Paul W. Senfleben
Leslie C. Battell
By their Attorney

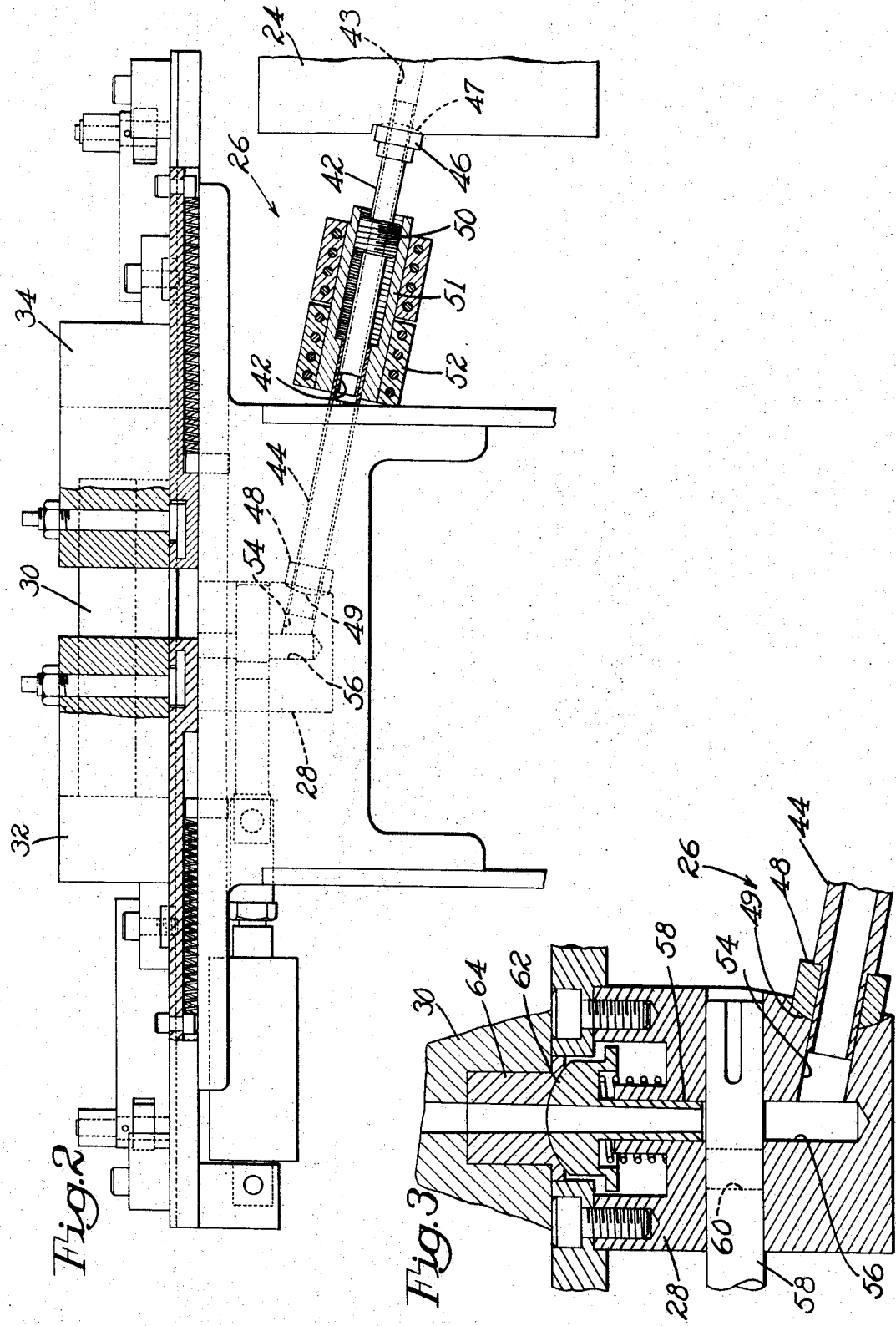

ative to each other lengthwise thereof. The ends of the conduit are arranged to seal against suitable sockets in the plasticator housing and mold assembly.

United States Patent Office 3,343,221
Patented Sept. 26, 1967

3,343,221
EXTENSIBLE CONDUIT FOR AN INJECTION MOLDING MACHINE
Walter W. Yarrison, Leslie C. Battell, and Paul W. Senfleben, Beverly, Mass., assignors to United Shoe Machinery Corporation, Flemington, N.J., a corporation of New Jersey
Original application Aug. 7, 1964, Ser. No. 388,070. Divided and this application Feb. 9, 1967, Ser. No. 614,949
3 Claims. (Cl. 18—30)

ABSTRACT OF THE DISCLOSURE

An injection molding machine having a plasticator and mold assembly in which the plasticator supplies hot fluid plastic under pressure to the cavity of the mold assembly through an extensible conduit. The conduit comprises sections arranged in telescoping relation and readily adjustable relatively to each other lengthwise thereof. The ends of the conduit are arranged to seal against suitable sockets in the plasticator housing and mold assembly.

*Cross-references to related applications*

This is a division of application Ser. No. 388,070, filed Aug. 7, 1964, in the names of Leslie C. Battell et al.

*Background of the invention including the field of the invention and a description of the prior art*

This invention relates to injection molding machines and is herein illustrated in its application to machines for molding and attaching sole and heel units to the bottoms of lasted footwear.

A machine of this type is disclosed, for example, in United States Letters Patent No. 3,006,032, granted Oct. 31, 1961, on an application filed in the names of Willard L. Baker et al. While the invention is herein illustrated in its application to machines for molding and attaching sole and heel units to the bottoms of lasted footwear, it is to be understood that the invention is not limited in scope to machines of this type but in certain aspects is applicable generally to injection molding machines.

The patent to Baker et al. above referred to discloses a machine designed for high volume production of shoes having sole and heel units molded in situ thereon. While there is a substantial demand for high volume production machines of this type, there has recently evolved a demand for a machine of this type designed for low volume production. Such a machine would, for example, be more suitable for use in a small shoe factory or in a factory where relatively low volume production of this type of shoe is contemplated.

*Summary of the invention*

It is an object of the present invention to provide an injection molding machine suited to low volume production in shoe factories where contemplated production of molded sole footwear would not be sufficient to maintain the operation of a machine of the type disclosed in the Baker et al. patent at full and efficient capacity.

It is a further object of the present invention to provide a low production machine of this type which while efficient in operation and capable of producing quality footwear, is of relatively inexpensive construction and well adapted to use in countries where relatively inexpensive footwear is the usual run of production.

With the above and other objects in view, as will hereinafter appear, the present invention in one aspect thereof contemplates the provision in an injection molding machine of a plasticator which, if desired, may supply each station of a two station machine. The plasticator supplies hot fluid plastic under pressure to the mold cavity through an extensible conduit of novel construction. The conduit comprises a first section, preferably tubular in construction, of relatively small diameter forming the receiving end portion of the conduit and a second section of relatively large diameter forming the delivering end portion of the conduit. The two sections are arranged in telescoping relation and suitable means is provided for so connecting the two sections together that they are readily adjustable relatively to each other lengthwise thereof. Such a conduit may readily be shortened sufficiently to permit it to be removed bodily from the machine to facilitate the removal therefrom of plastic which has become solidified while the machine remains idle.

In accordance with a further feature of the invention there is incorporated in each section of the extensible conduit an abutment member, one of said members being arranged to seat against a suitable socket in the plasticator and the other being arranged to seat against a suitable socket in a housing which mounts the injection nozzle. By extending the conduit the abutment members may be forcibly seated in their sockets so as to prevent the occurrence of undue flash between the abutment members and their sockets.

These and other features of the invention will now be described with reference to the accompanying drawings and pointed out in the appended claims.

*Brief description of the drawings*

FIG. 2 is an enlarged view in front elevation and partly in section illustrating the mold assembly and associated parts at the left side of the machine; and FIG. 3 is a sectional view of a portion of the machine shown in FIG. 2 and on a substantially larger scale than FIG. 2.

*Description of the preferred embodiment*

Figure 1:
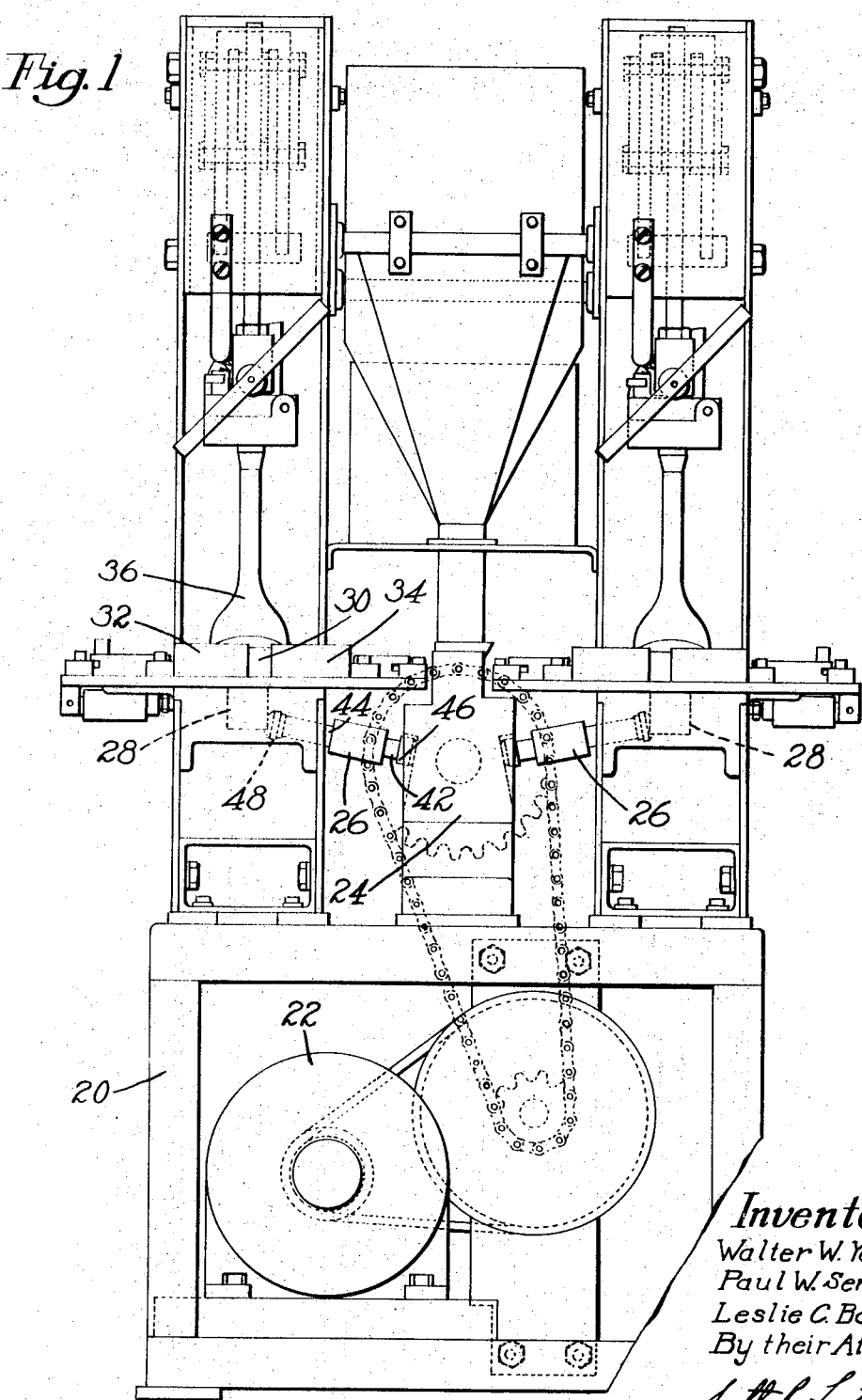
FIG. 1 is a front elevation illustrating a machine embodying the features of the present invention.

Referring to FIG. 1, the invention is illustrated as embodied in a two station machine for injection molding of sole and heel units in situ onto shoe bottoms. The drawings illustrate a floor mounted machine having a base frame 20 in which there is mounted an electrical motor 22 from which power is transmitted through a suitable clutch and a chain drive to a plasticator generally indicated by the numeral 24. From the plasticator fluid plastic is transmitted through two telescoping conduits 26 extending in opposite directions, each with a slightly upward inclination, to two cylindrical housings 28 in two stations of the machine respectively, said stations being identified generally in FIG. 1 by reference characters A and B. The following description will be directed to the construction in station A, but it will be understood that it will be equally applicable to the construction in station B.

The telescoping conduit 26 extending to the left from the plasticator 24 connects the plasticator to the cylindrical housing 28 which mounts an injection nozzle hereinafter to be described. When the passage in the housing from the conduit to the injection nozzle is open, fluid plastic is transmitted through the housing and the nozzle to a mold cavity which is formed by a bottom mold member 30 and two side mold members 32 and 34 and is closed at the top during the mold charging operation by the bottom of a lasted boot mounted on a foreshortenable metal boot form 36.

Referring to FIG. 2, the conduit 26 comprises a tubular portion 42 of relatively small diameter which is slidably fitted into a bore 43 in the casing of the plasticator 24, said bore communicating with the delivery end portion of the plasticator cylinder. At its left end portion, as shown in FIG. 2, the tubular member 42 is in telescoping engagement with a larger tube 44. The opposite end of the tube 44 is slidably fitted into an inclined bore 54 formed in the housing 28 (see also FIG. 3). Mounted on the tubular member 42 near its right end is a collar 46 having a convex face 47 complemental in shape to a concave socket formed in the casing of the plasticator. Similarly, the tube 44 has fixed thereto near its left end a collar 48 having a convex face 49 shaped complementally to a concave recess formed in the housing 28.

In order to provide for the convenient adjustment of the length of the conduit 26 to bring the collars into seeking engagement with their sockets the tubular member 42 has fixed thereon an externally threaded member 50 in threaded engagement with an internally threaded member 51 secured to the tube 44. Mounted on the cylindrical outer surface of the member 51 are suitable thermostatically controlled band heaters 52.

In operation, the conduit 26 is placed between the plasticator 24 and the housing 28 in shortened form and with one end of the conduit, for example the left end as shown in FIG. 2, disposed within the appropriate bore 54 and the convex face 49 seated in the corresponding concave surface. With the other end of the conduit extending in a direction toward the bore 43, the operator rotates the tube 42 in a counterclockwise direction. Rotation of the tube 42 and thereby the threaded member 50, causes the smaller tube 42 to move outwardly from the internally threaded member 51. The rotation of the tube 42 continues until the right end of the tube 42 enters the bore 43 and the convex face 47 of the collar member 46 engages its corresponding concave surface. The conduit is now in place and adapted to transmit injection molding material from the bore 43 (plasticator outlet) to the bore 54 (injection nozzle housing inlet). From the bore 54 the injection molding material proceeds through a bore 56 and a valve 58 having a passage 60, to an injection nozzle 62 which is engageable with a sprue plug 64. The structure and operation of the valve 58 and injection nozzle 62 is fully described in the above-mentioned patent application.

When the machine is idle for extended periods of time injection molding material solidifies in the conduit 26. To remove such material it is necessary only to rotate the tube 42 clockwise so as to shorten the conduit lengthwise, thereby permitting its withdrawal from the machine for cleaning. The conduit is then replaced, as described above, and is in condition for transferring molten material from the plasticator 24 to the nozzle housing 28.

Having thus described our invention, what we claim as new and desire to secure by Letters Patent of the United States is:

1. In an injection molding machine, the combination with mold members defining a mold cavity of a plasticator for supplying hot fluid plastic under pressure to the mold cavity and an extensible conduit for conducting hot fluid plastic from the plasticator to the mold cavity, said conduit comprising a first section of relatively small diameter forming the receiving end portion of the conduit and telescoping into a second section of relatively large diameter forming the delivering end portion of the conduit, and means for so connecting the two sections together that they are relatively adjustable lengthwise thereof, the construction of the conduit being such that plastic solidified therein can be extracted therefrom by longitudinal movement of the conduit relatively to the solidified plastic with the section of small diameter foremost.

2. In an injection molding machine, the combination with mold members defining a mold cavity and a plasticator for supplying hot fluid plastic under pressure to the mold cavity, of a nozzle through which hot fluid plastic passes into the mold cavity, a housing in which the nozzle is mounted and an extensible conduit through which hot fluid plastic is conducted from the plasticator to the housing, said conduit comprising a first tubular section of relatively small diameter slidably mounted in a suitable passage in the plasticator and a second tubular section of relatively large diameter slidably mounted in a suitable passage in the housing, a first abutment member on the first tubular section constructed to seat against a suitable socket formed in the plasticator, a second abutment member mounted on the second tubular member constructed to seat against a suitable socket formed in the housing and means whereby relative movement of the two sections of the conduit may be effected to cause said abutment members to seat firmly in their sockets.

3. In an injection molding machine, the combination with mold members defining a mold cavity and a plasticator for supplying hot fluid plastic under pressure to the mold cavity, of a nozzle through which hot fluid plastic passes into the mold cavity, a housing in which the nozzle is mounted and an extensible conduit through which hot fluid plastic is conducted from the plasticator to the housing, said conduit comprising a first tubular section of relatively small diameter having an end portion slidably mounted in a suitable passage in the plasticator and a second tubular section of relatively large diameter having an end portion slidably mounted in a suitable passage in the housing, a first abutment member on the first tubular section constructed to seat against a suitable socket formed in the plasticator, a second abutment member on the second tubular member constructed to seat against a suitable socket formed in the housing, and means whereby relative movement of the two sections of the conduit may be effected to cause said abutment members to seat firmly in their sockets, the construction of the conduit being such that after a length of plastic has solidified within the conduit the tubular sections can be moved lengthwise thereof relatively to each other thereby to shorten the conduit and to retract the first tubular section from the passage in the plasticator and to retract the second tubular member from the passage in the housing, and the conduit thus shortened can be removed bodily from the machine whereupon its sections can be disconnected from each other to facilitate the clearance of such solidified plastic from the conduit.

References Cited

UNITED STATES PATENTS 3,134,141   5/1964   Hardy _____ 18
3,205,536   9/1965   Funck _____ 18—30

J. SPENCER OVERHOLSER, *Primary Examiner.*

W. L. McBAY, *Assistant Examiner.*